US012768682B2

(12) United States Patent
Yoda et al.

(10) Patent No.: US 12,768,682 B2
(45) Date of Patent: Oct. 20, 2026

(54) DETECTION SYSTEM, DETECTION DEVICE, AND DETECTION METHOD

(71) Applicant: NEC Corporation, Tokyo (JP)

(72) Inventors: Yukihide Yoda, Tokyo (JP); Koyo Mori, Tokyo (JP); Tadayuki Iwano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 372 days.

(21) Appl. No.: 18/566,757

(22) PCT Filed: Jun. 8, 2021

(86) PCT No.: PCT/JP2021/021661
§ 371 (c)(1),
(2) Date: Dec. 4, 2023

(87) PCT Pub. No.: WO2022/259346
PCT Pub. Date: Dec. 15, 2022

(65) Prior Publication Data
US 2024/0271972 A1 Aug. 15, 2024

(51) Int. Cl.
*G01D 5/353* (2006.01)
*G01H 9/00* (2006.01)
*G01M 10/00* (2006.01)
*H04N 23/66* (2023.01)

(52) U.S. Cl.
CPC ..... *G01D 5/35374* (2013.01); *G01D 5/35354* (2013.01); *G01H 9/004* (2013.01); *G01M 10/00* (2013.01); *H04N 23/66* (2023.01)

(58) Field of Classification Search
CPC ........... G01D 5/35374; G01D 5/35354; H04N 23/66; G01H 9/004; G01M 10/00
USPC ........................................................... 73/655
See application file for complete search history.

(56) References Cited

FOREIGN PATENT DOCUMENTS

| | | | | |
|---|---|---|---|---|
| JP | 2000046597 | A | * | 2/2000 |
| JP | 2003-232043 | A | | 8/2003 |
| JP | 2007-101274 | A | | 4/2007 |
| JP | 2007-127534 | A | | 5/2007 |
| JP | 2007292530 | A | * | 11/2007 |
| WO | 2021/029186 | A1 | | 2/2021 |

OTHER PUBLICATIONS

Translation of JP-2007292530-A (Year: 2007).*
Translation of JP-2000046597-A (Year: 2000).*
International Search Report for PCT Application No. PCT/JP2021/021661, mailed on Aug. 10, 2021.

* cited by examiner

*Primary Examiner* — Nathaniel T Woodward

(57) ABSTRACT

A detection system according to the present disclosure includes: an optical fiber (30) embedded in or near an embankment (20) of a river (10); a communication unit (41) that receives, from the optical fiber (30), an optical signal including a pattern indicating that the optical fiber (30) is exposed; and detection unit (51) that detects breakage of the embankment (20) based on the pattern.

12 Claims, 16 Drawing Sheets

ABNORMAL STATE (EXPOSURE OF OPTICAL FIBER 30 DUE TO OVERFLOW AND BREAKAGE OF EMBANKMENT 20)

ABNORMAL STATE (EXPOSURE OF OPTICAL FIBER 30 DUE TO OVERFLOW AND BREAKAGE OF EMBANKMENT 20)

| CAMERA IDENTIFIER | IMAGEABLE AREA (DISTANCE FROM SENSING EQUIPMENT) |
|---|---|
| #1 | aa[m]～bb[m] |
| #2 | cc[m]～dd[m] |
| #3 | ee[m]～ff[m] |

Fig. 15

DETECTION SYSTEM, DETECTION DEVICE, AND DETECTION METHOD

This application is a National Stage Entry of PCT/JP2021/021661 filed on Jun. 8, 2021, the contents of all of which are incorporated herein by reference, in their entirety.

TECHNICAL FIELD

The present disclosure relates to a detection system, a detection device, and a detection method.

BACKGROUND ART

In recent years, disasters such as breakage of embankments of rivers due to the influence of typhoons and storms are increasing. Therefore, it is required to collect information regarding embankment breakage in real time in order to improve the efficiency of countermeasures against disasters. At present, whether or not embankment breakage has occurred is confirmed by visual observation of a camera image or direct visual observation.

However, in a case of the confirmation using visual observation, a range that can be confirmed at a time is local. In addition, it may be difficult to accurately determine the state of an embankment by the confirmation using visual observation depending on the weather (bad weather or the like) and a time zone (nighttime or the like).

Therefore, it is necessary to confirm the state of an embankment in a wide range and in real time without visual observation.

On the other hand, recently, a technology called optical fiber sensing capable of performing real-time sensing in a wide range by using an optical fiber as a sensor has attracted attention, and various proposals using the optical fiber sensing have been made.

For example, in the technology described in Patent Literature 1, an optical fiber is embedded in the soil in such a way as to extend in a longitudinal direction of an embankment. Then, the amount of distortion at each location of the optical fiber is calculated by detecting scattered light output from the optical fiber when pulsed light is input to the optical fiber. The amount of distortion at each location of the optical fiber increases in accordance with an increase in amount of movement of earth and sand. Therefore, occurrence of a sediment disaster is detected based on the amount of distortion at each location calculated above.

CITATION LIST

Patent Literature

Patent Literature 1: Japanese Unexamined Patent Application Publication No. 2003-232043

SUMMARY OF INVENTION

Technical Problem

However, the technology described in Patent Literature 1 is a technology for detecting the occurrence of a sediment disaster, and cannot detect embankment breakage.

Therefore, an object of the present disclosure is to solve the above-described problems and to provide a detection system, a detection device, and a detection method capable of detecting embankment breakage.

Solution to Problem

A detection system according to one aspect includes:

an optical fiber embedded in or near an embankment of a river;

a communication unit configured to receive, from the optical fiber, an optical signal including a pattern indicating that the optical fiber is exposed; and a detection unit configured to detect breakage of the embankment based on the pattern.

A detection device according to one aspect includes:

a communication unit configured to receive, from an optical fiber embedded in or near an embankment of a river, an optical signal including a pattern indicating that the optical fiber is exposed; and a detection unit configured to detect breakage of the embankment based on the pattern.

A detection method according to an aspect is executed by the detection device and includes:

a reception step of receiving, from an optical fiber embedded in or near an embankment of a river, an optical signal including a pattern indicating that the optical fiber is exposed; and a detection step of detecting breakage of the embankment based on the pattern.

Advantageous Effects of Invention

According to the above aspect, it is possible to provide the detection system, the detection device, and the detection method capable of detecting embankment breakage.

BRIEF DESCRIPTION OF DRAWINGS

FIG. 15 is a diagram illustrating an example of camera information held by a camera control unit according to the third example embodiment.

EXAMPLE EMBODIMENT

Example embodiments of the present disclosure are described below with reference to the drawings. Note that in the description and drawings described below, omission and simplification are made as appropriate, for clarity of description. Furthermore, in each of the drawings described below, the same elements are denoted by the same reference signs, and an overlapping description is omitted as necessary.

First Example Embodiment

First, an image example of a detection system according to a first example embodiment will be described with reference to FIG. 1.

Figure 1:
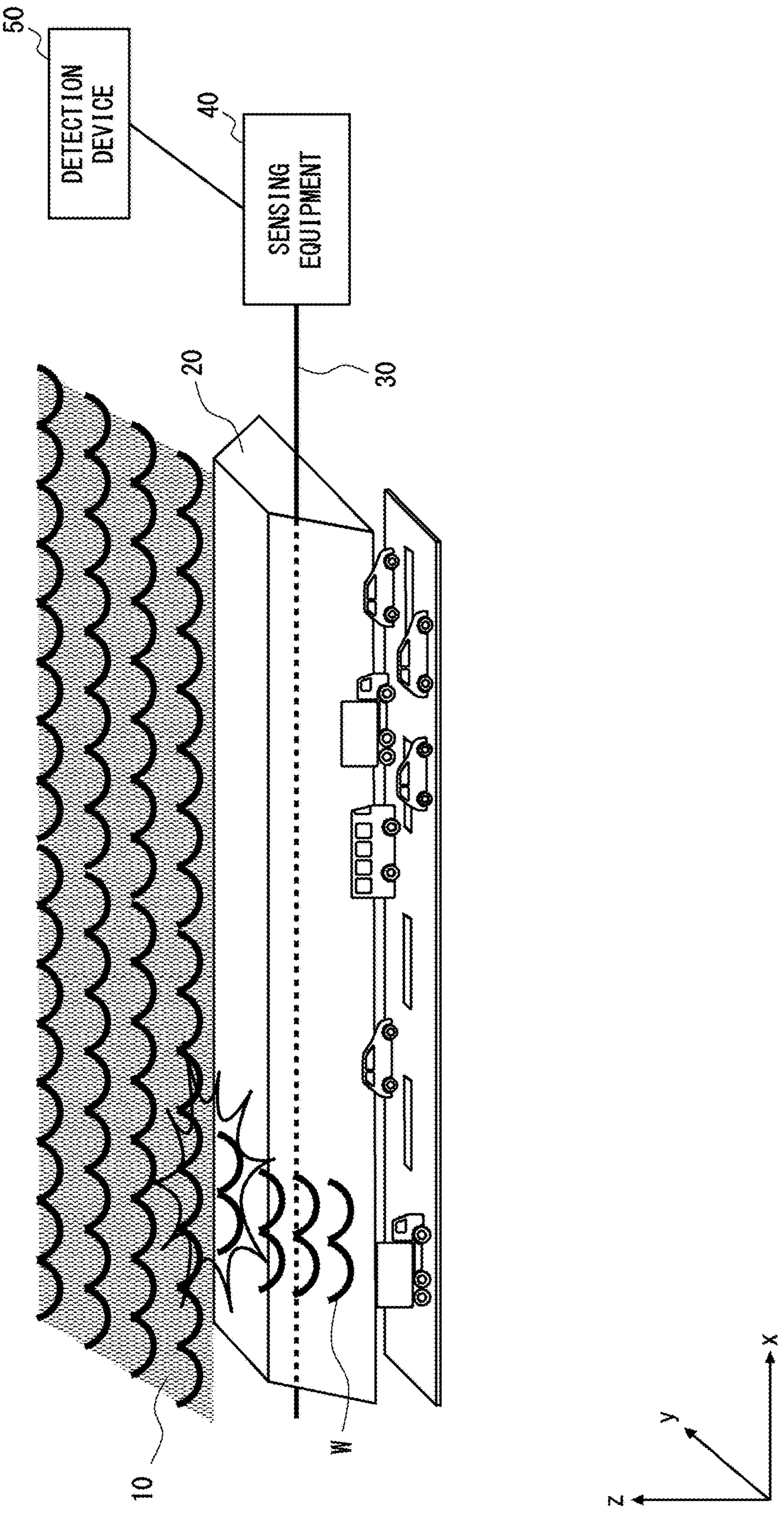
FIG. 1 is a diagram illustrating an image example of a detection system according to a first example embodiment.

As illustrated in FIG. 1, the detection system according to the first example embodiment includes an optical fiber 30 embedded in or near an embankment 20 of a river 10. In the example of FIG. 1, the optical fiber 30 is embedded in the embankment 20 along the embankment 20. FIG. 1 illustrates a state in which water W of the river 10 overflows over the embankment 20 and flows out to a road beside the embankment 20.

In addition, one end of the optical fiber 30 is connected to sensing equipment 40, and the sensing equipment 40 is connected to a detection device 50. The sensing equipment 40 and the detection device 50 may be connected via either a wired communication path or a wireless communication path. The detection device 50 can be installed at a location away from the sensing equipment 40, and can be arranged on a cloud, for example.

Figure 2:
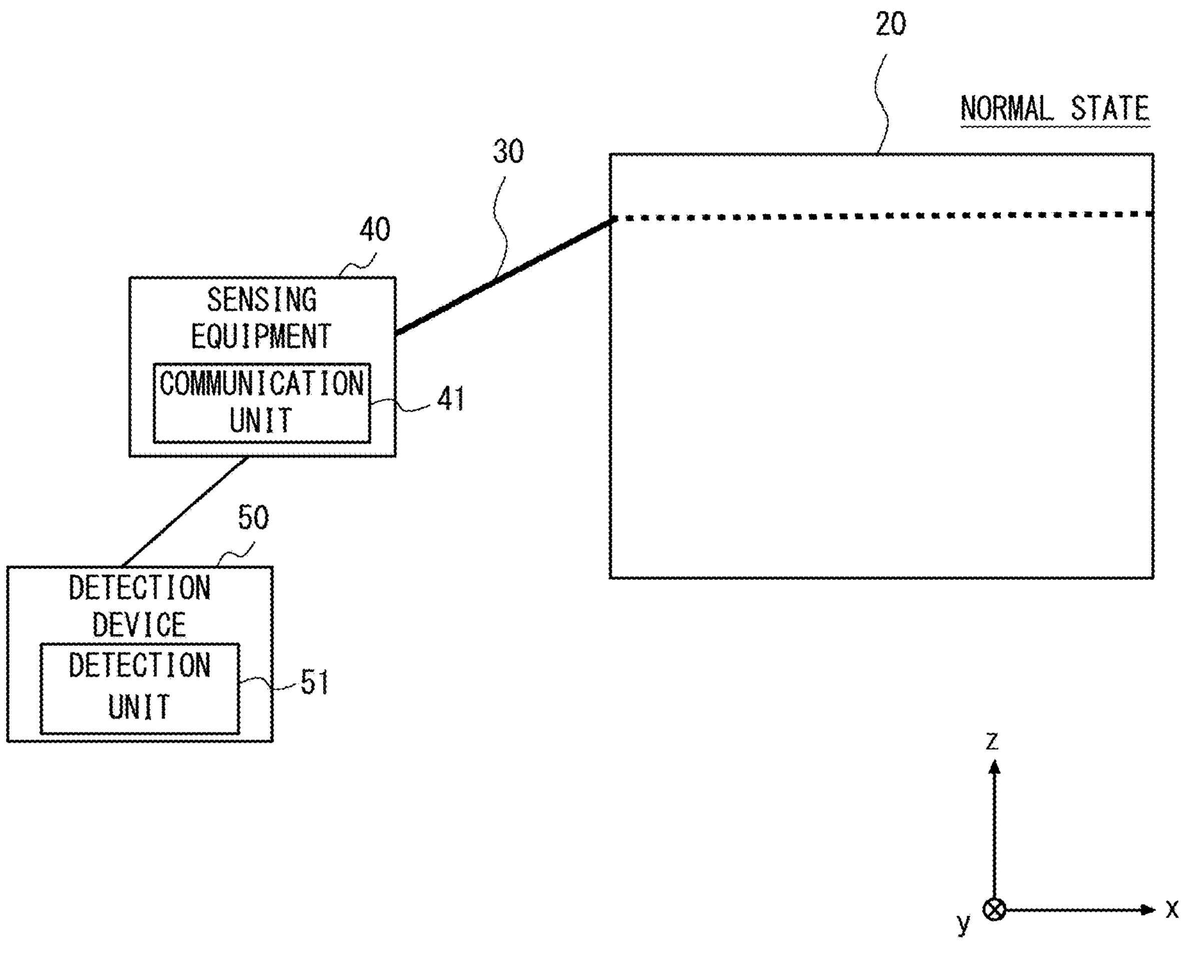
FIG. 2 is a diagram illustrating a configuration example of the detection system according to the first example embodiment.
Figure 3:
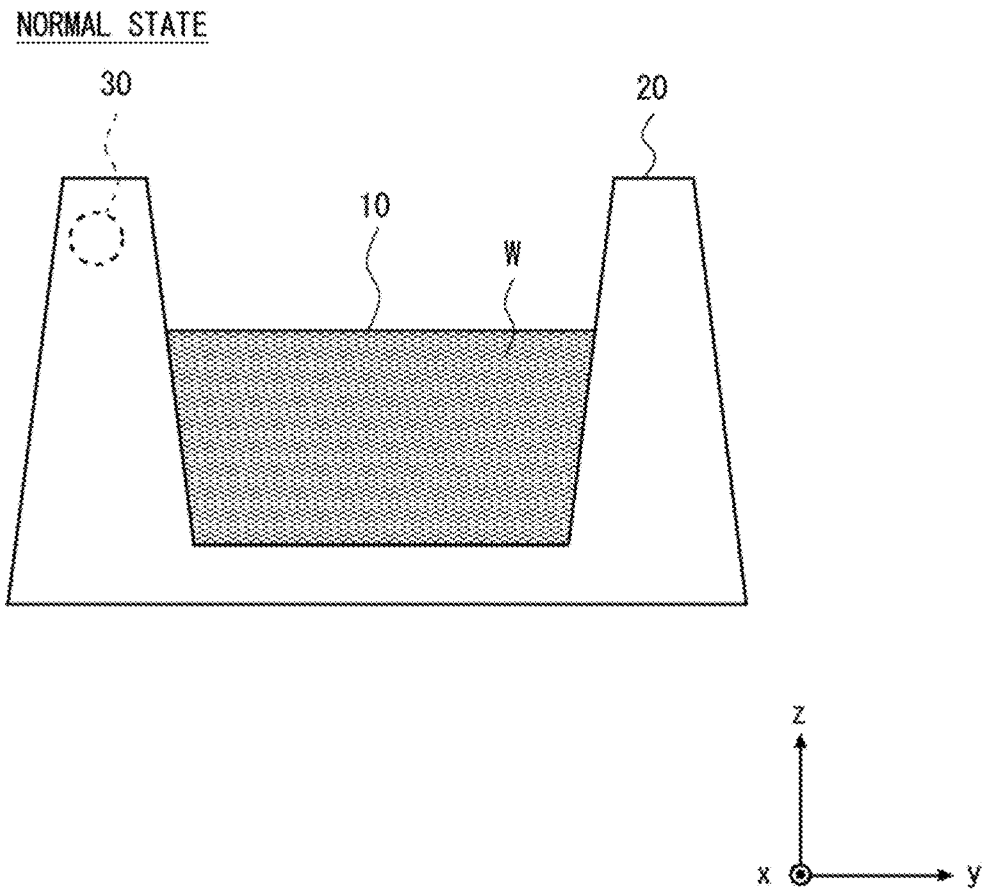
FIG. 3 is a cross-sectional view illustrating an example of an embankment in a normal state.

Next, a configuration example of the detection system according to the first example embodiment will be described with reference to FIGS. 2 and 3. FIGS. 2 and 3 are cross-sectional views of the embankment 20 in a normal state, in which FIG. 2 is a cross-sectional view parallel to the river 10, and FIG. 3 is a cross-sectional view perpendicular to the river 10.

As illustrated in FIGS. 2 and 3, the detection system according to the first example embodiment includes the optical fiber 30, the sensing equipment 40, and the detection device 50 as described above. Furthermore, the sensing equipment 40 includes a communication unit 41, and the detection device 50 includes a detection unit 51.

The communication unit 41 applies pulsed light to the optical fiber 30, and receives reflected light and/or scattered light, which are caused (or generated) as the pulsed light is transmitted through the optical fiber 30, as an optical signal through the optical fiber 30.

Figure 4:
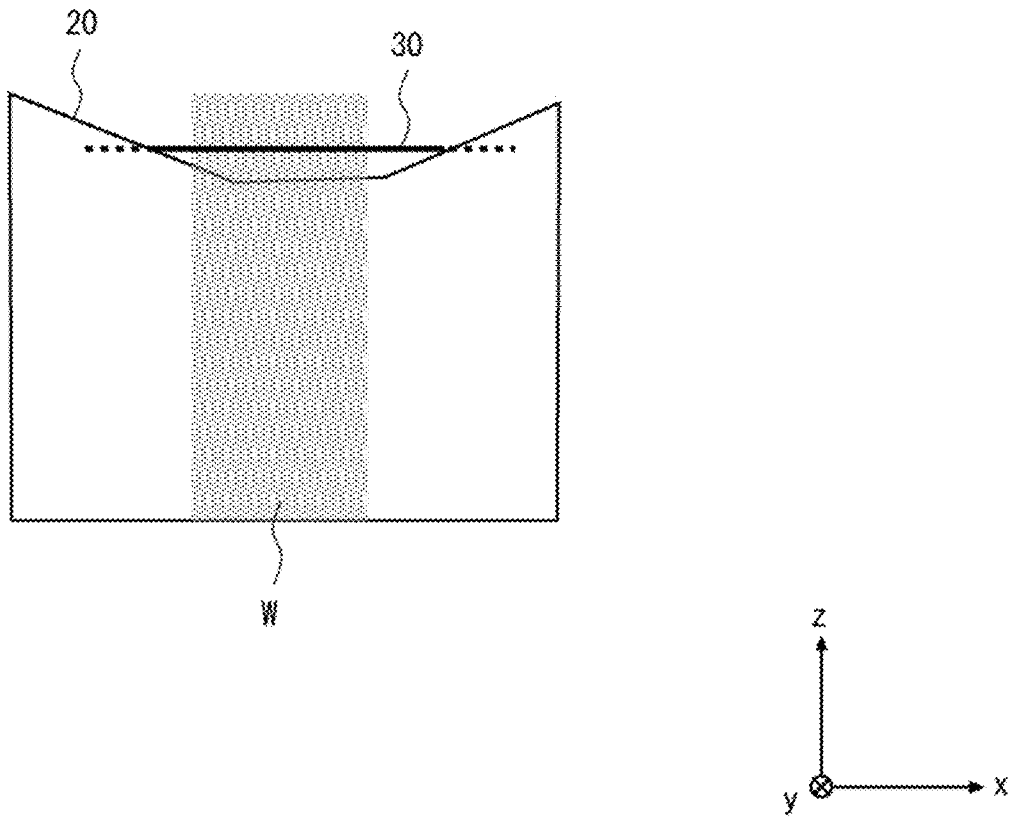
FIG. 4 is a cross-sectional view illustrating an example of the embankment in a state in which an optical fiber is exposed due to overflow and embankment breakage.
Figure 5:
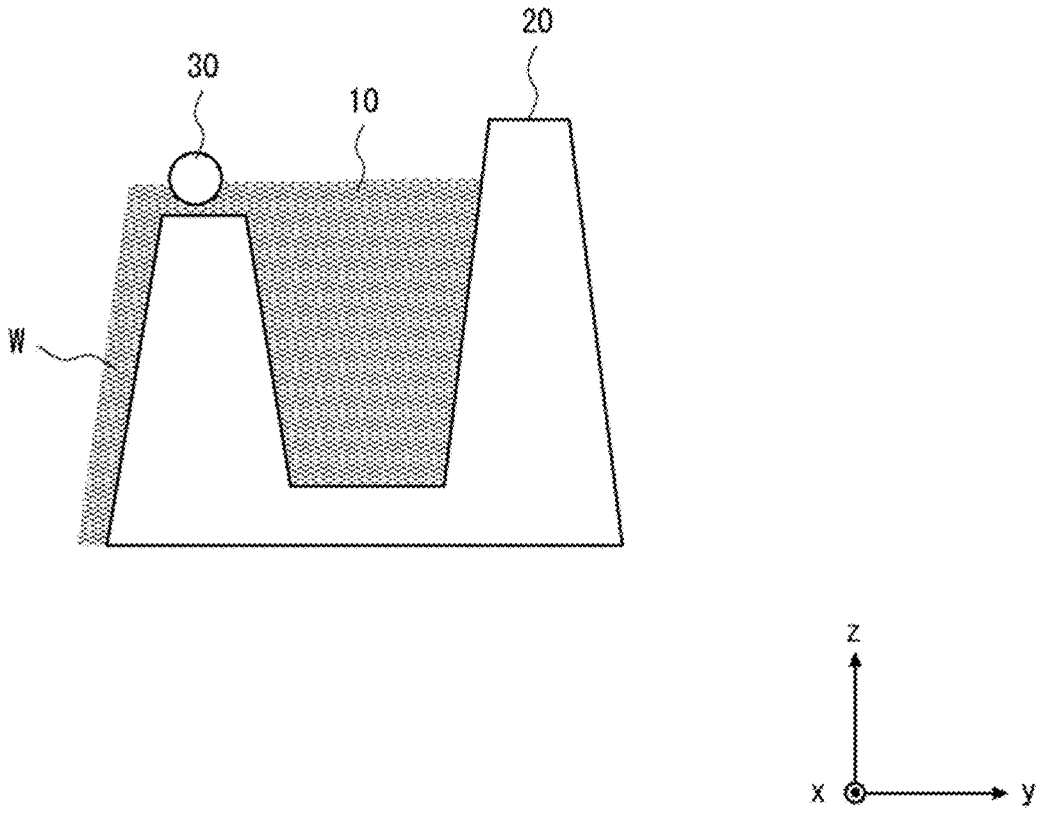
FIG. 5 is a cross-sectional view illustrating an example of the embankment in a state in which an optical fiber is exposed due to overflow and embankment breakage.

Here, as illustrated in FIGS. 4 and 5, the embankment 20 may be broken due to an overflow of the water W of the river 10, and the optical fiber 30 may be exposed due to breakage of the embankment 20. FIGS. 4 and 5 are cross-sectional views of the embankment 20 in a state in which the optical fiber 30 is exposed due to an overflow and breakage of the embankment 20, in which FIG. 4 is a cross-sectional view parallel to the river 10, and FIG. 5 is a cross-sectional view perpendicular to the river 10.

When the optical fiber 30 is exposed, the overflowing water W directly hits the optical fiber 30, as a result of which vibration is generated in the optical fiber 30. The vibration changes a characteristic (for example, a wavelength) of the optical signal transmitted through the optical fiber 30. Therefore, the optical fiber 30 can detect the vibration generated by the exposure of the optical fiber 30. Further, the optical signal transmitted through the optical fiber 30 includes a vibration pattern indicating that the optical fiber 30 is exposed because the characteristic of the optical signal changes according to the vibration generated by the exposure of the optical fiber 30. The vibration pattern is a unique pattern in which a trend of fluctuations in vibration intensity, vibration location, and vibration frequency, and the like is different.

In addition, when the optical fiber 30 is exposed, the overflowing water W directly hits the optical fiber 30, as a result of which the temperature of the optical fiber 30 changes. The temperature change also changes the characteristic of the optical signal transmitted through the optical fiber 30. Therefore, the optical signal transmitted through the optical fiber 30 also includes a temperature pattern indicating that the optical fiber 30 is exposed.

Therefore, the detection unit 51 analyzes a dynamic change of the vibration pattern or the temperature pattern included in the optical signal received by the communication unit 41, and if the vibration pattern or the temperature pattern indicating that the optical fiber 30 is exposed is included, it is possible to detect that the optical fiber 30 is exposed, that is, the embankment 20 is broken.

The detection unit 51 detects breakage of the embankment 20 based on the vibration pattern or the temperature pattern included in the optical signal received by the communication unit 41 and indicating that the optical fiber 30 is exposed.

Hereinafter, an example of a method of detecting breakage of the embankment 20 by the detection unit 51 will be described.

(1) First Method

Figure 6:
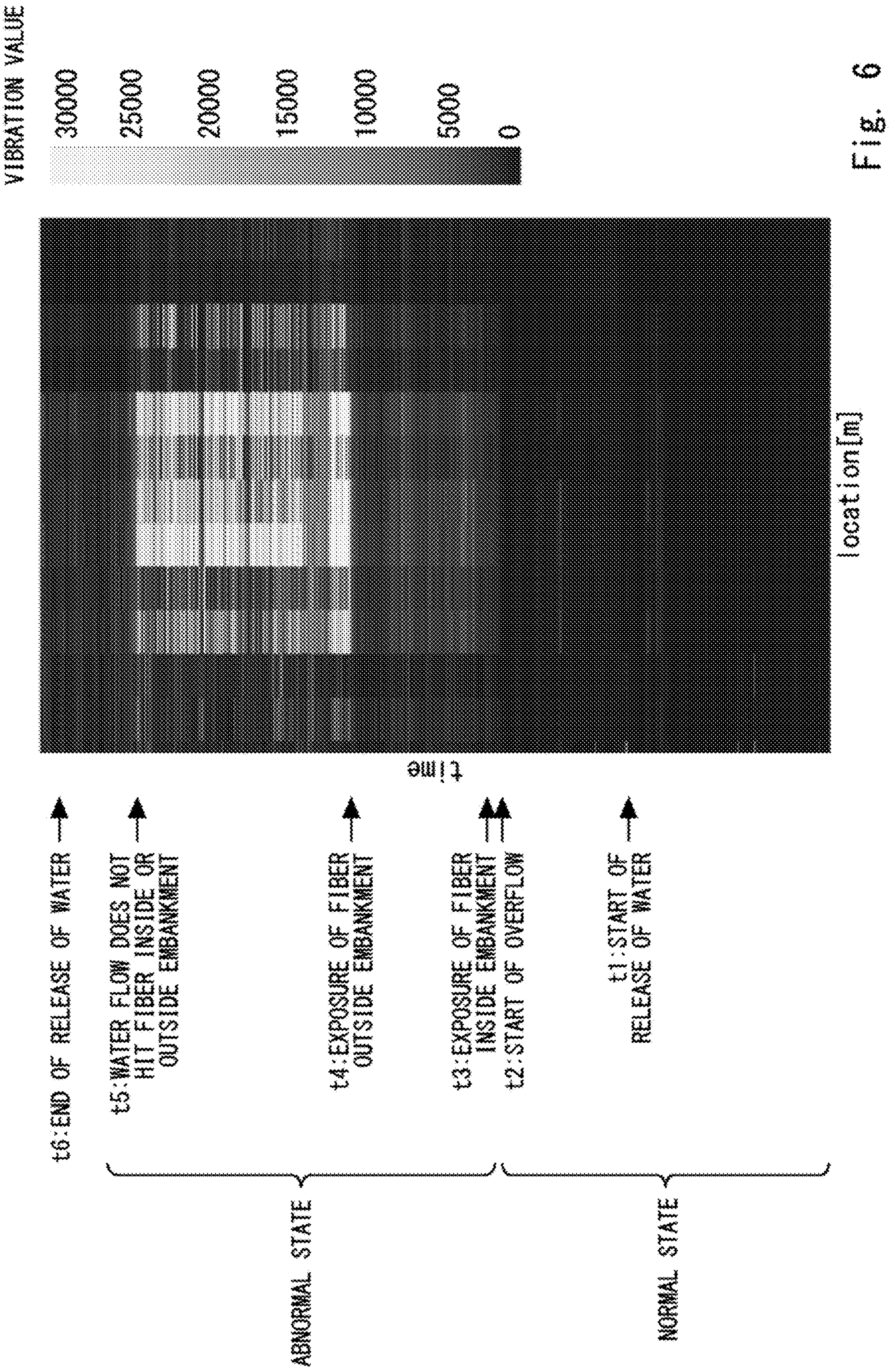
FIG. 6 is a diagram illustrating an example of a vibration pattern included in an optical signal received by a communication unit according to the first example embodiment.

First, a first method of detecting breakage of the embankment 20 by the detection unit 51 will be described with reference to FIG. 6. FIG. 6 illustrates an example of the vibration pattern included in the optical signal received by the communication unit 41 when the water W is intentionally released into the river 10, in which the horizontal axis represents a location on the embankment 20 (a distance from the sensing equipment 40), and the vertical axis represents the lapse of time of vibration.

For example, the detection unit 51 can specify the location (the distance from the sensing equipment 40) on the embankment 20 where the vibration pattern included in the optical signal is generated based on a time difference between a time when the communication unit 41 applied pulsed light to the optical fiber 30 and a time when the communication unit 41 receives the optical signal from the optical fiber 30.

As illustrated in FIG. 6, as the release of the water W into the river 10 starts at time t1, the overflow of the water W of the river 10 starts at time t2.

Then, at time t3, the optical fiber 30 in the embankment is exposed, and the overflowing water W directly hits the optical fiber 30 in the embankment, as a result of which weak vibration is generated.

Next, at time t4, the optical fiber 30 outside the embankment is exposed this time, and the water W directly hits the optical fiber 30 outside the embankment, as a result of which strong vibration is generated.

The vibration generated as described above is continuously generated until time t5 at which the water W does not hit the optical fiber 30 inside and outside the embankment.

Thereafter, at time t6, the release of the water W into the river 10 ends.

As illustrated in FIG. 6, in a case where the optical fiber 30 is exposed and the overflowing water W directly hits the optical fiber 30, vibration is continuously generated over time.

Therefore, in the example of FIG. 6, the detection unit 51 can detect that the optical fiber 30 is exposed, that is, that the embankment 20 is broken. In addition, as described above, since the detection unit 51 can specify the location (the distance from the sensing equipment 40) on the embankment 20 where the vibration pattern included in the optical signal is generated, it is possible to specify the location (the distance from the sensing equipment 40) on the embankment 20 where the breakage has occurred.

(2) Second Method

Figure 7:
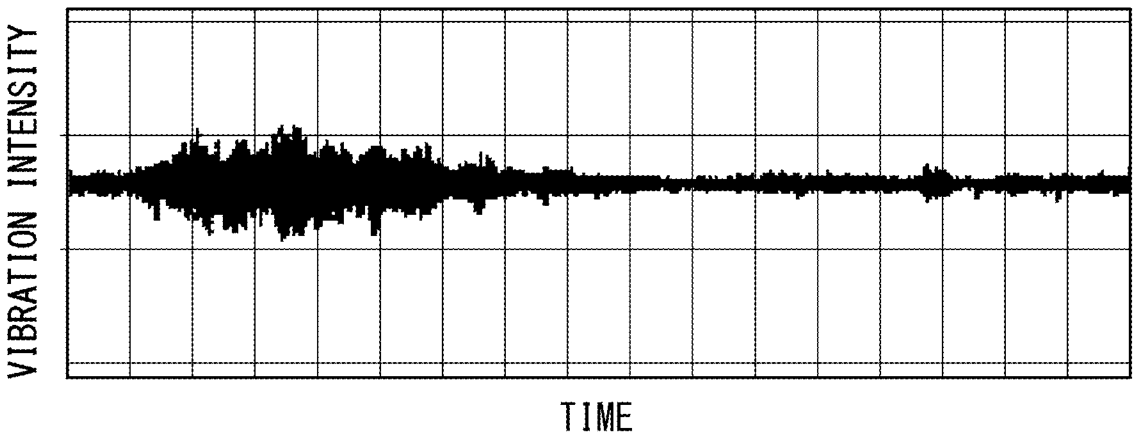
FIG. 7 is a diagram illustrating an example of the vibration pattern included in the optical signal received by the communication unit according to the first example embodiment.
Figure 8:
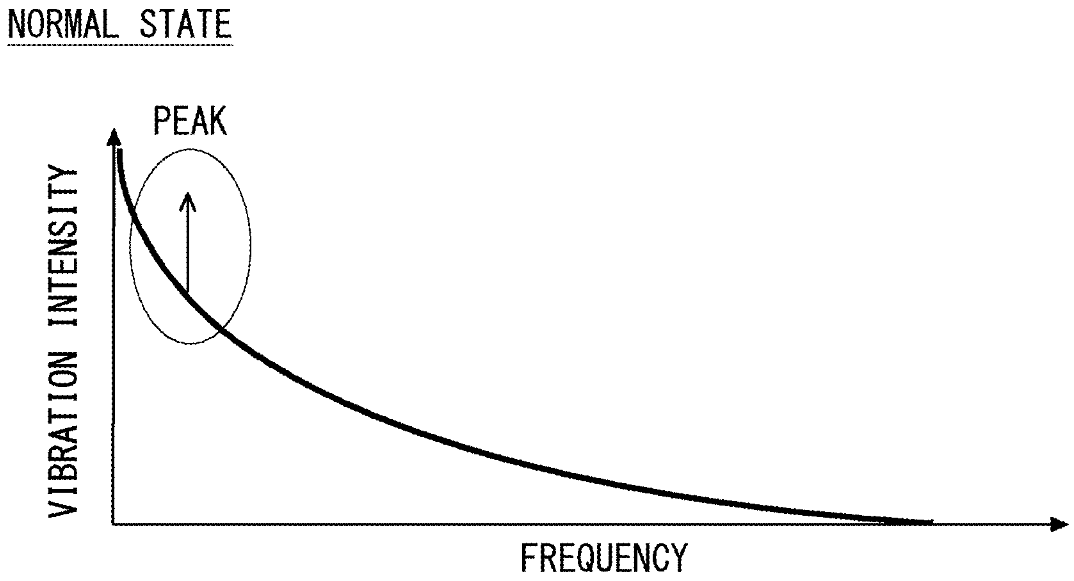
FIG. 8 is a diagram illustrating an example of a frequency characteristic of the vibration pattern included in the optical signal received by the communication unit according to the first example embodiment.
Figure 9:
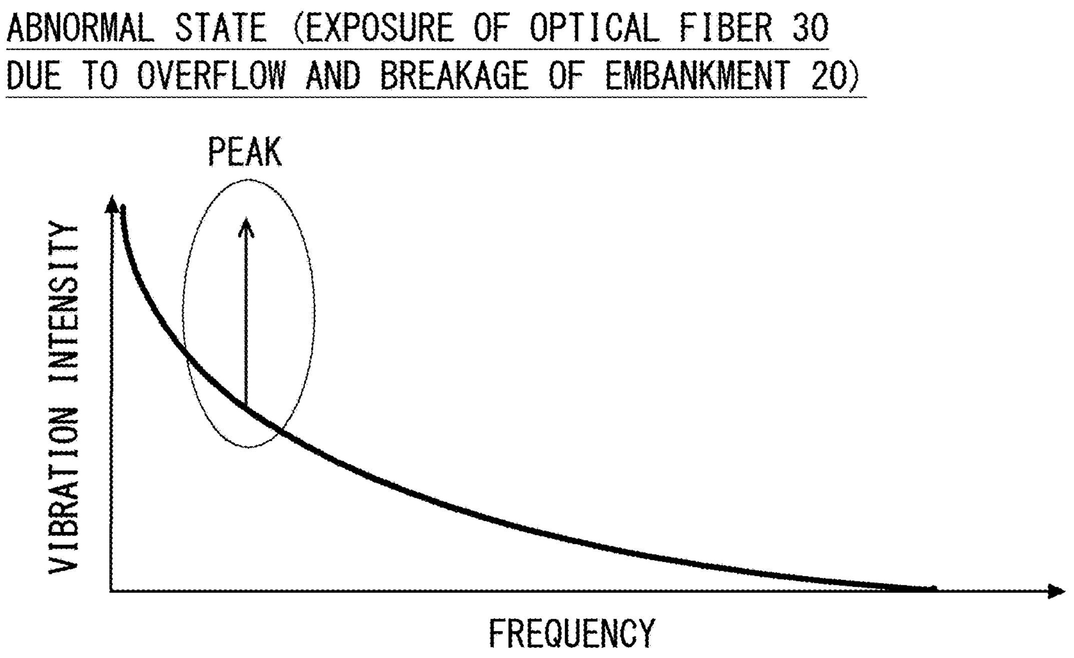
FIG. 9 is a diagram illustrating an example of the frequency characteristic of the vibration pattern included in the optical signal received by the communication unit according to the first example embodiment.

Next, a second method of detecting breakage of the embankment 20 by the detection unit 51 will be described with reference to FIGS. 7 to 9. FIG. 7 illustrates an example of the vibration pattern that is included in the optical signal received by the communication unit 41 and is at a certain location on the embankment 20, in which the horizontal axis represents time and the vertical axis represents vibration intensity. FIGS. 8 and 9 illustrate a frequency characteristic of the vibration pattern that is included in the optical signal received by the communication unit 41 and is at a certain location on the embankment 20, in which the horizontal axis represents frequency and the vertical axis represents vibration intensity. FIG. 8 illustrates an example of the vibration pattern in a case where the embankment 20 is in a normal state, and FIG. 9 illustrates an example of the vibration pattern in a case where the embankment 20 is in an abnormal state (here, the optical fiber 30 is exposed due to breakage of the embankment 20).

In the vibration patterns illustrated in FIGS. 8 and 9, a peak of the vibration intensity occurs. The magnitude of the peak of the vibration intensity and the frequency at which the peak occurs differ depending on the state of the embankment 20. Specifically, in a state in which the optical fiber 30 is exposed due to breakage of the embankment 20 (FIG. 9), the magnitude of the peak of the vibration intensity is larger and the frequency at which the peak occurs is shifted to a higher frequency side as compared with a state in which the embankment 20 is in a normal state (FIG. 8).

Therefore, the detection unit 51 determines whether or not the optical fiber 30 is exposed, that is, whether or not the embankment 20 is broken based on the magnitude of the peak of the vibration intensity and the frequency at which the peak occurs. For example, the detection unit 51 holds information regarding the magnitude of the peak of the vibration intensity and the frequency at which the peak occurs in a state where the embankment 20 is normal (FIG. 8), and determines whether or not the embankment 20 is broken by comparison with the held information.

In the example of FIG. 9, the magnitude of the peak of the vibration intensity is larger, and the frequency at which the peak occurs is shifted to a higher frequency side as compared with the held information (the information of FIG. 8). Accordingly, the detection unit 51 can detect breakage of the embankment 20. The detection unit 51 can specify the location (the distance from sensing equipment 40) on the embankment 20 where the breakage has occurred.

Next, an example of an overall operation flow of the detection system according to the first example embodiment will be described with reference to FIG. 10.

Figure 10:
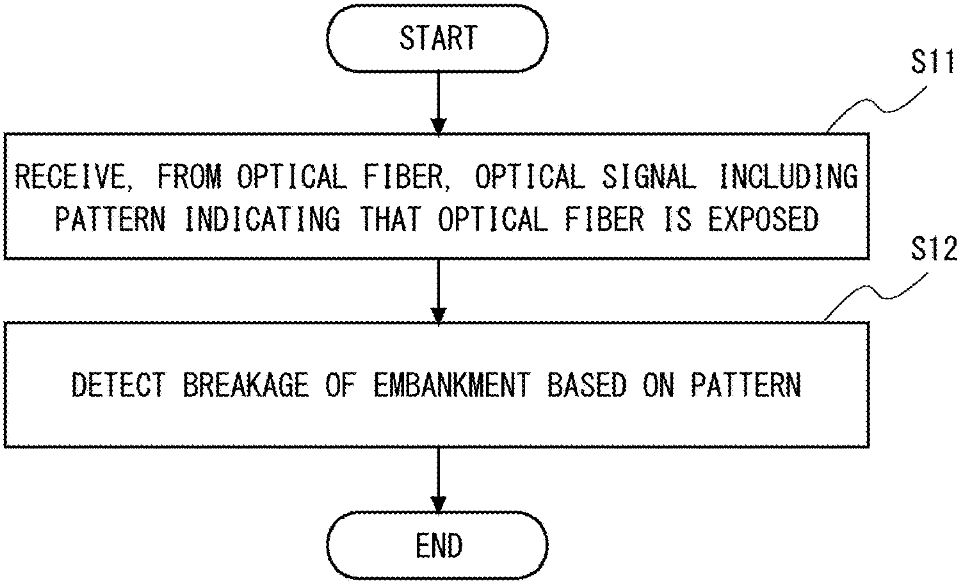
FIG. 10 is a flowchart illustrating an example of an overall operation flow of the detection system according to the first example embodiment.

As illustrated in FIG. 10, first, the communication unit 41 receives an optical signal including a pattern indicating that the optical fiber 30 is exposed, from the optical fiber 30 embedded in or near the embankment 20 of the river 10 (step S11).

Next, the detection unit 51 detects breakage of the embankment 20 based on the pattern included in the optical signal received by the communication unit 41 and indicating that the optical fiber 30 is exposed (step S12). The detection may be performed using, for example, one of the first and second methods described above.

As described above, according to the first example embodiment, the communication unit 41 receives the optical signal including the pattern indicating that the optical fiber 30 is exposed, from the optical fiber 30 embedded in or near the embankment 20 of the river 10. The detection unit 51 detects breakage of the embankment 20 based on the pattern included in the optical signal received by communication unit 41 and indicating that optical fiber 30 is exposed. Accordingly, breakage of the embankment 20 can be detected.

The detection unit 51 may specify the location where the embankment 20 is broken based on the optical signal received by the communication unit 41. As a result, the location where the embankment 20 is broken can also be specified.

Second Example Embodiment

Next, a configuration example of a detection system according to a second example embodiment will be described with reference to FIG. 11.

Figure 11:
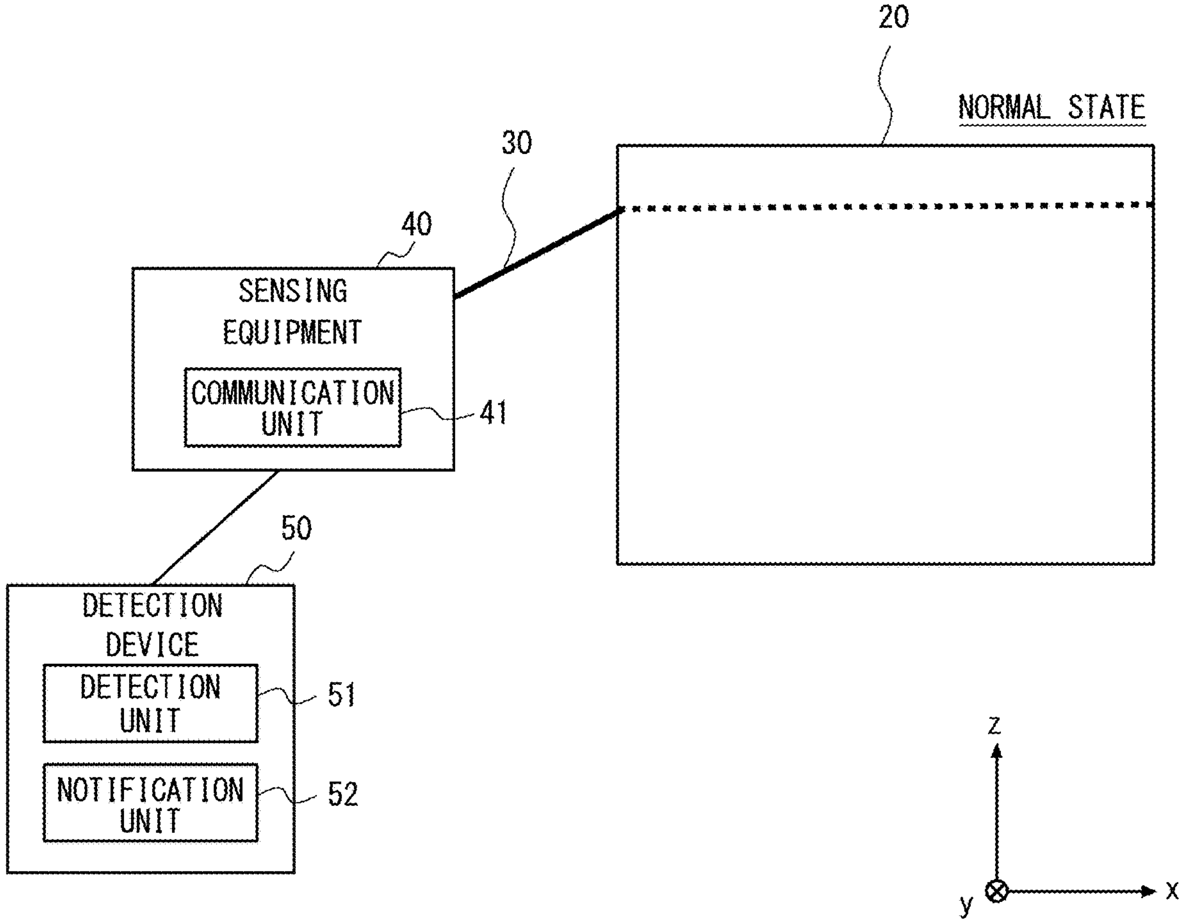
FIG. 11 is a diagram illustrating a configuration example of a detection system according to a second example embodiment.

As illustrated in FIG. 11, the detection system according to the second example embodiment is different from the configuration of the first example embodiment described above in that a notification unit 52 is added inside a detection device 50. FIG. 11 is a cross-sectional view of an embankment 20 in a normal state, the cross-section view being parallel to a river 10.

In a case where a detection unit 51 has detected breakage of the embankment 20 and has specified a location where the embankment 20 is broken, the notification unit 52 notifies a predetermined terminal (not illustrated) of the occurrence of the breakage of the embankment 20 and the location where the breakage has occurred. The predetermined terminal is, for example, a terminal carried by a surveillance staff on the site, a terminal installed in a surveillance center, or the like. A notification method may be, for example, a method of displaying a graphical user interface (GUI) screen on a display, a monitor, or the like of the predetermined terminal, or a method of outputting a message by voice from a speaker of the predetermined terminal.

Figure 12:
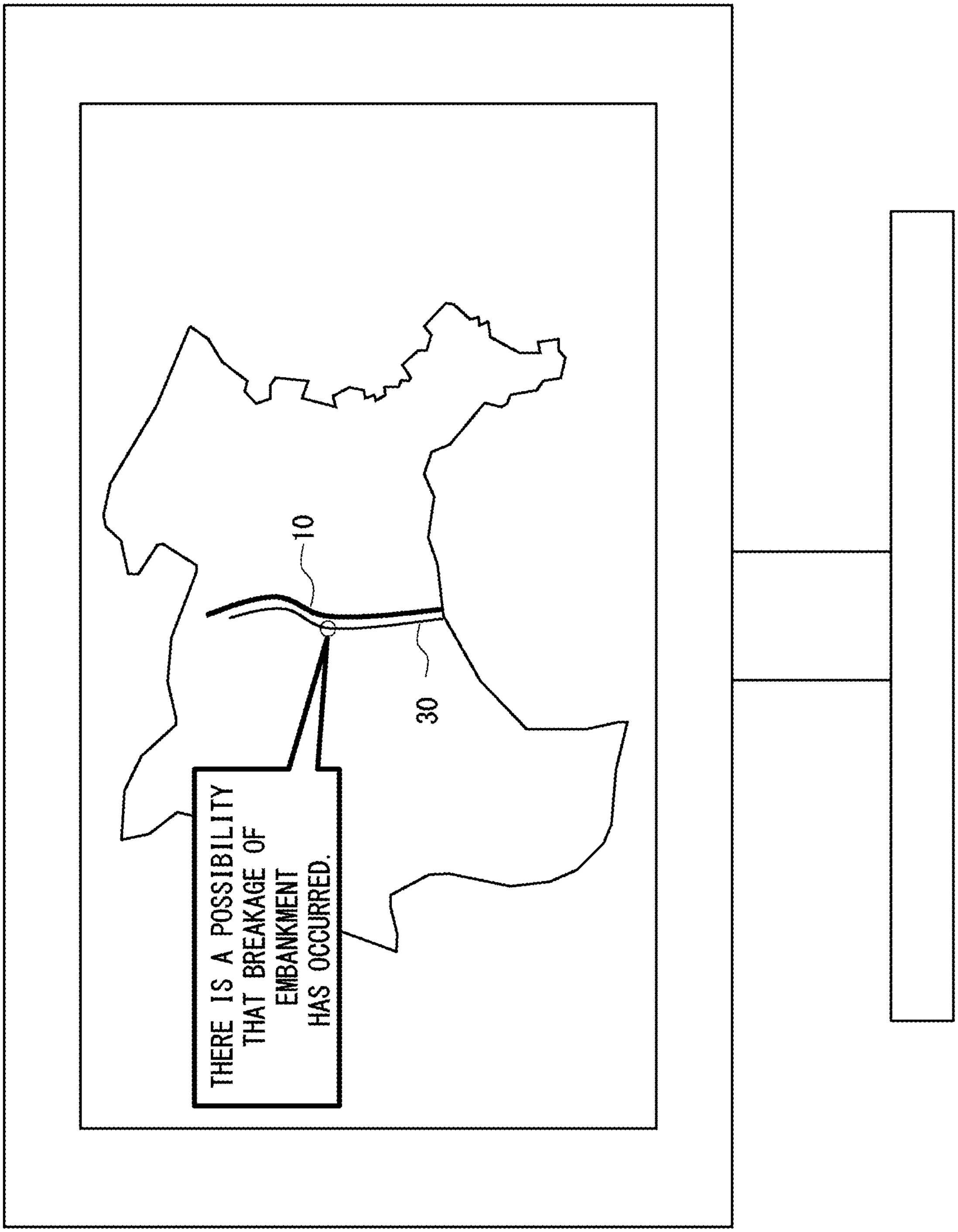
FIG. 12 is a diagram illustrating an example of a graphical user interface (GUI) screen displayed on a predetermined terminal by a notification unit according to the second example embodiment.

For example, in a case where the above notification is performed by displaying the GUI screen, the notification unit 52 operates as follows. The notification unit 52 holds in advance information indicating a laying location of the optical fiber 30 and map information in association with each other. In a case where the detection unit 51 has detected breakage of the embankment 20 and has specified the location where the breakage has occurred, the notification unit 52 causes the predetermined terminal to display the GUI screen in which the breakage occurrence location specified by the detection unit 51 is superimposed on a map. An example of the GUI screen is illustrated in FIG. 12. In the GUI screen illustrated in FIG. 12, the laying location of the optical fiber 30, a message indicating that there is a possibility that breakage has occurred, and the breakage occurrence location are superimposed on the map.

Next, an example of an overall operation flow of the detection system according to the second example embodiment will be described with reference to FIG. 13.

Figure 13:
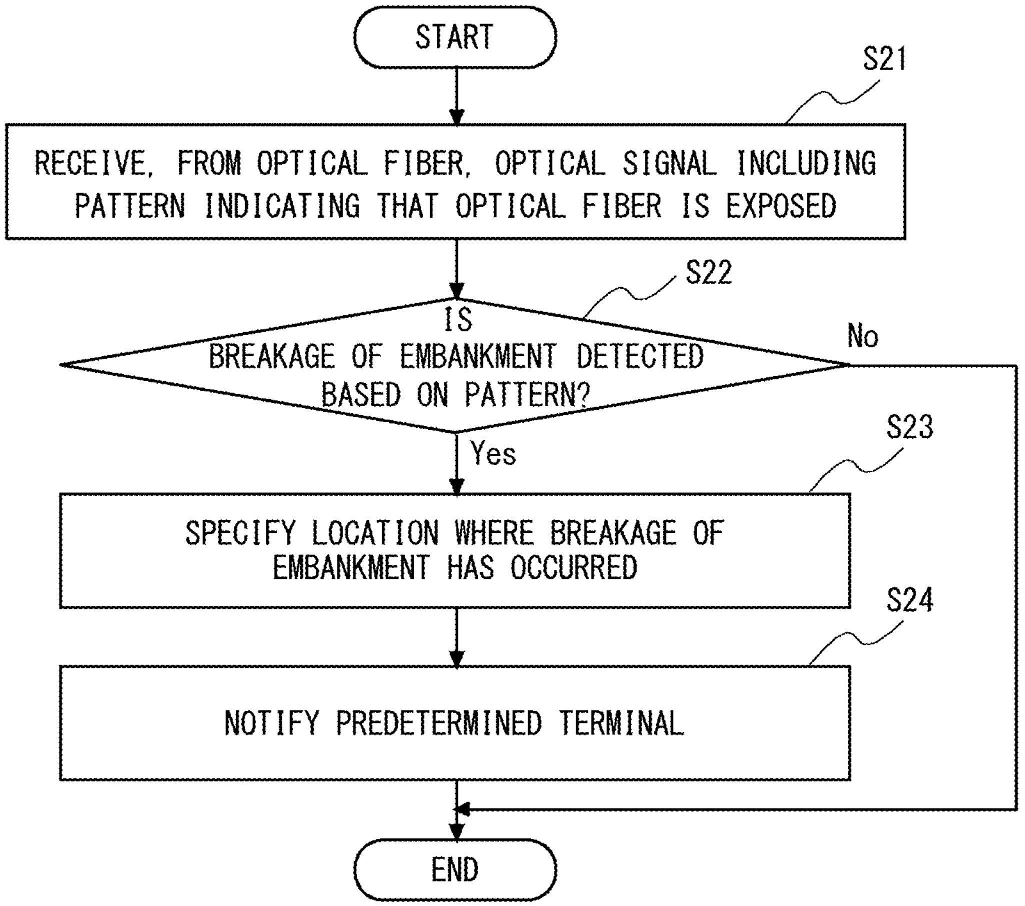
FIG. 13 is a flowchart illustrating an example of an overall operation flow of the detection system according to the second example embodiment.

As illustrated in FIG. 13, first, the communication unit 41 receives an optical signal including a pattern indicating that the optical fiber 30 is exposed, from the optical fiber 30 embedded in or near the embankment 20 of the river 10 (step S21).

Next, the detection unit 51 attempts to detect breakage of the embankment 20 based on the pattern included in the optical signal received by the communication unit 41 and indicating that the optical fiber 30 is exposed (step S22).

In a case where breakage of the embankment 20 is detected in step S22 (Yes in step S22), the detection unit 51 subsequently specifies a location where the breakage of the embankment 20 has occurred based on the optical signal received by the communication unit 41 (step S23).

Thereafter, the notification unit 52 notifies the predetermined terminal of the occurrence of the breakage of the embankment 20 and the location where the breakage has occurred (step S24). The notification may be performed using, for example, the GUI screen as illustrated in FIG. 12.

As described above, according to the second example embodiment, in a case where the detection unit 51 has detected breakage of the embankment 20 and has specified the location where the breakage has occurred, the notification unit 52 notifies the predetermined terminal of the occurrence of the breakage of the embankment 20 and the location where the breakage has occurred. As a result, for example, it is possible to notify a surveillance staff or the like of the occurrence of the breakage of the embankment 20 and the location where the breakage has occurred.

The other effects are similar to effects according to the first example embodiment described above.

Third Example Embodiment

Figure 14:
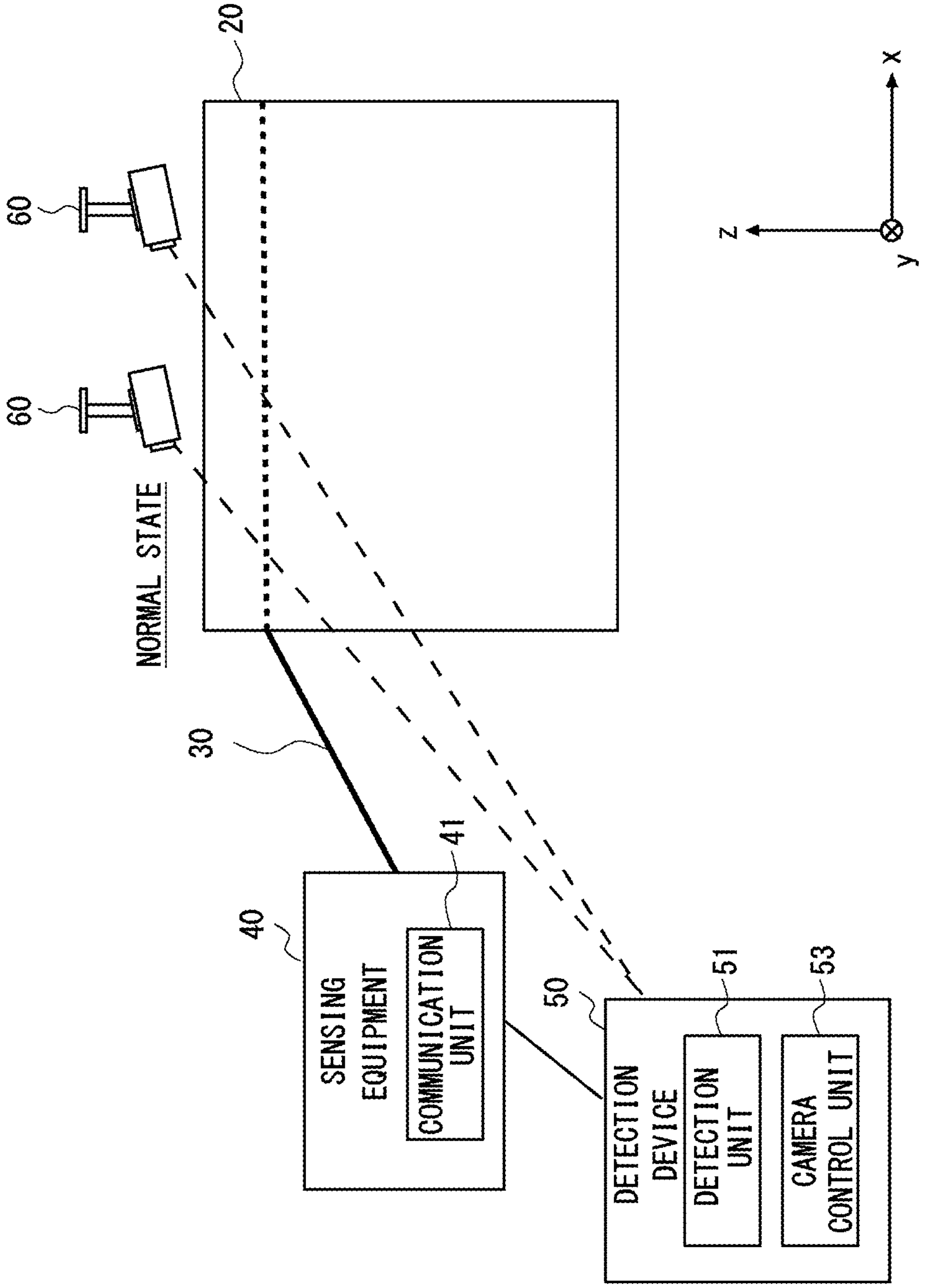
FIG. 14 is a diagram illustrating a configuration example of a detection system according to a third example embodiment.

Next, a configuration example of a detection system according to a third example embodiment will be described with reference to FIG. 14. FIG. 14 is a cross-sectional view of an embankment 20 in a normal state, the cross-section view being parallel to a river 10.

As illustrated in FIG. 14, the detection system according to the third example embodiment is different from the configuration of the first example embodiment described above in that a camera 60 is added and a camera control unit 53 is added inside a detection device 50.

The camera 60 is a camera for monitoring the river 10 and the embankment 20, and is implemented by, for example, a fixed camera, a pan-tilt-zoom (PTZ) camera, or the like. The camera 60 has a function of wirelessly receiving an imaging instruction from the camera control unit 53, a function of performing imaging according to the imaging instruction, and a function of wirelessly transmitting a captured camera image to the camera control unit 53. It is sufficient if one or more cameras 60 are installed, and the number of cameras 60 is not particularly limited.

As illustrated in FIG. 15, the camera control unit 53 holds camera information indicating an identifier of the camera 60, an imageable area, and the like. FIG. 15 is an example of the camera information in a case where three cameras 60 are installed, and the imageable area is represented by a distance from a sensing equipment 40.

In a case where the detection unit 51 has detected breakage of the embankment 20 and has specified a location where the embankment 20 is broken, the camera control unit 53 selects the camera 60 for imaging an area including the location where the breakage has occurred based on the camera information as illustrated in FIG. 15, and controls the selected camera 60 to image the location where the breakage has occurred. For example, the camera control unit 53 transmits, to the selected camera 60, an imaging instruction specifying an angle (an azimuth angle and an elevation angle) of the camera 60, a zoom magnification, and the like for imaging the location where the breakage has occurred. The camera 60 that has received the imaging instruction images the location where the breakage has occurred according to the imaging instruction, and transmits the captured camera image to the camera control unit 53.

Therefore, in a case where breakage of the embankment 20 is detected, the detection unit 51 can acquire the camera image obtained by imaging the location where the breakage of the embankment 20 has occurred, so that the details (for example, the detailed contents and the degree of breakage) of the breakage of the embankment 20 can be detected based on the camera image.

Next, an example of an overall operation flow of the detection system according to the third example embodiment will be described with reference to FIG. 16.

Figure 16:
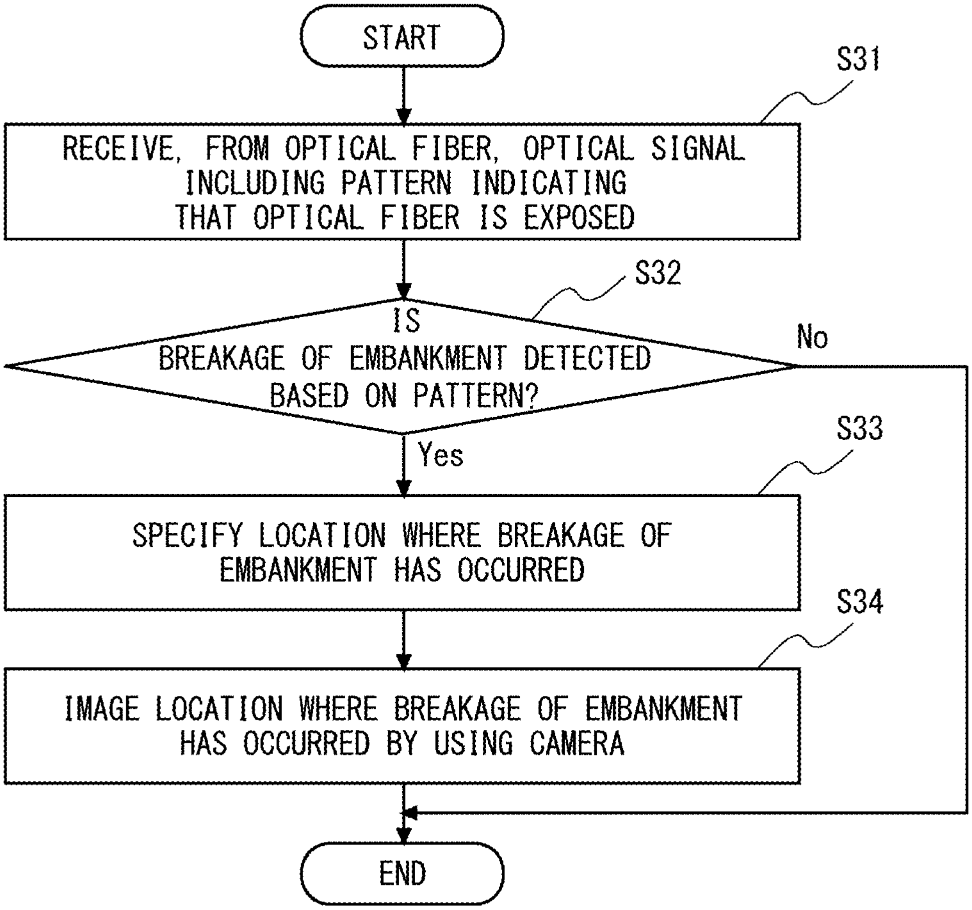
FIG. 16 is a flowchart illustrating an example of an overall operation flow of the detection system according to the third example embodiment.

As illustrated in FIG. 16, first, steps S31 to S33 similar to steps S21 to S23 in FIG. 13 are performed.

Thereafter, the camera control unit 53 selects the camera 60 for imaging an area including a location where the embankment 20 is broken, and controls the selected camera 60 to image the location where the embankment is broken (step S34).

As described above, according to the third example embodiment, in a case where the detection unit 51 has detected breakage of the embankment 20 and has specified a location where the breakage has occurred, the camera control unit 53 controls the camera 60 to image the location where the breakage has occurred. The detection unit 51 can thus detect details of the breakage of the embankment 20 (for example, the detailed contents and the degree of breakage) based on the camera image.

The third example embodiment is described as a modification of the first example embodiment described above, but the present disclosure is not limited thereto. The third example embodiment may be an example of the modification of the second example embodiment described above.

Other Example Embodiments

Figure 17:
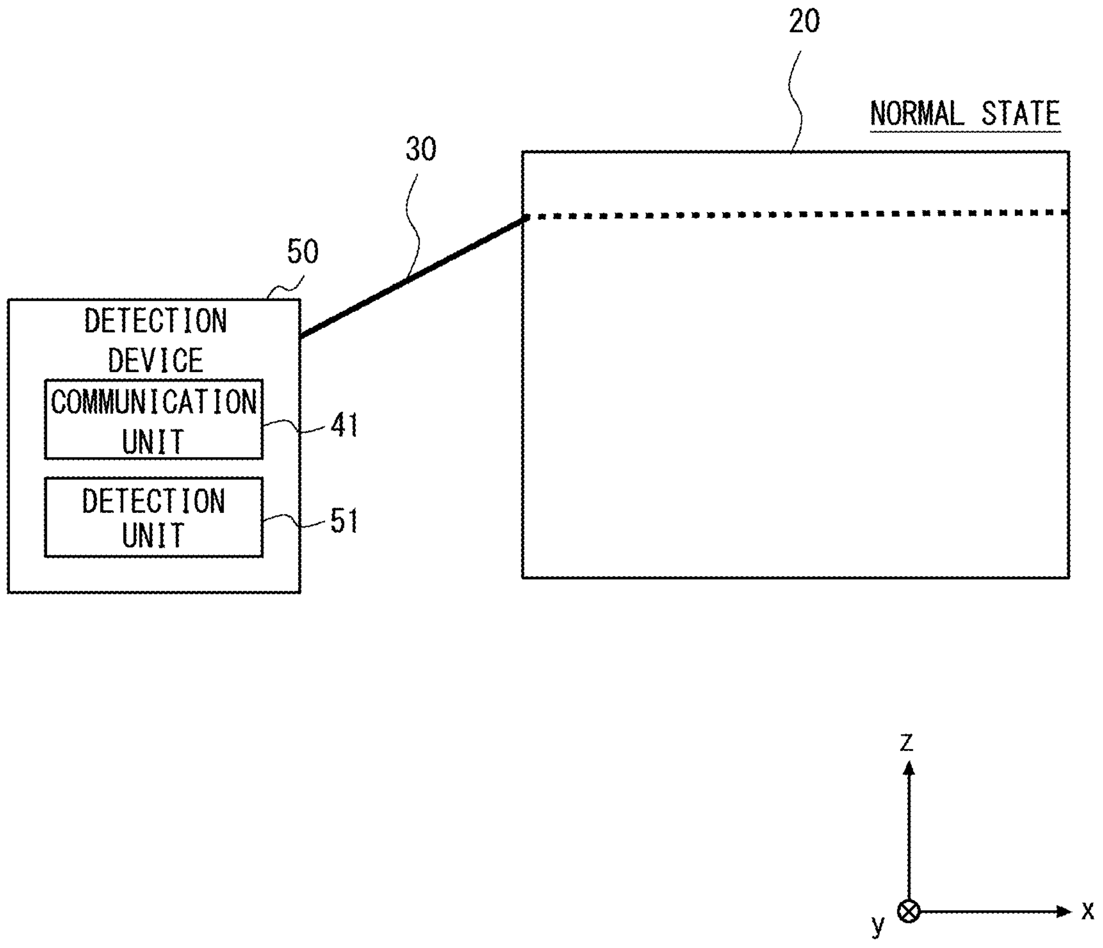
FIG. 17 is a diagram illustrating a configuration example of a detection system according to another example embodiment.

In the above-described example embodiments, the communication unit 41 is separated from the detection device 50, but the present disclosure is not limited thereto. The communication unit 41 may be provided inside the detection device 50. FIG. 17 illustrates a configuration example of a detection system in which the communication unit 41 is provided inside the detection device 50. In the detection system illustrated in FIG. 17, the notification unit 52 may be added to the inside of the detection device 50 as in the above-described second example embodiment, or the camera 60 may be added and the camera control unit 53 may be added to the inside of the detection device 50 as in the above-described third example embodiment.

<Hardware Configuration of Detection Device>

Next, a hardware configuration example of a computer 70 that implements the detection devices 50 according to the above-described example embodiments will be described with reference to FIG. 18.

Figure 18:
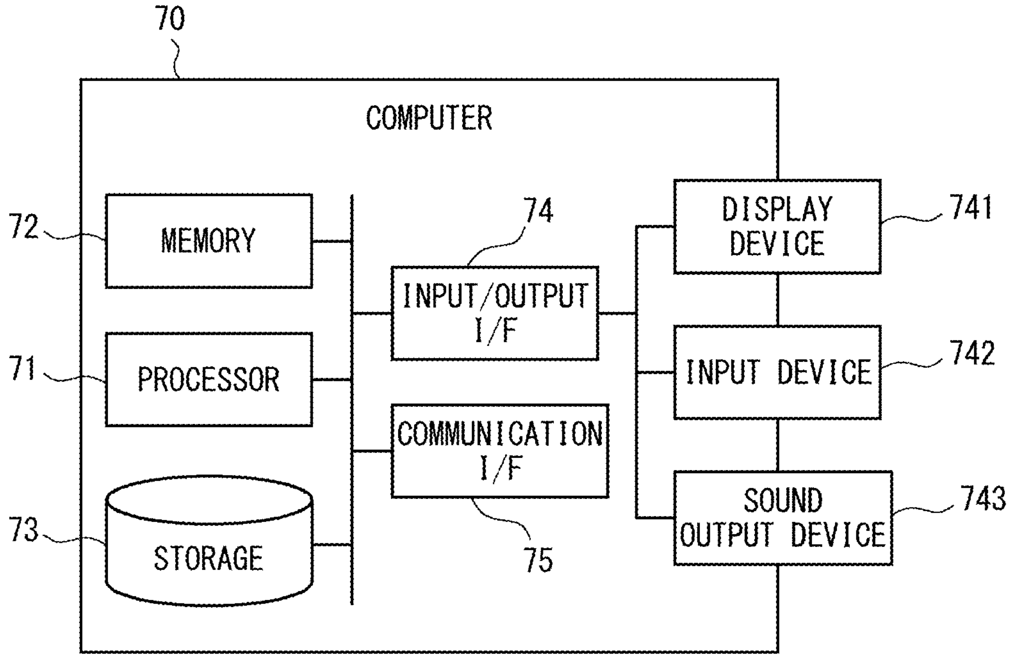
FIG. 18 is a block diagram illustrating a hardware configuration example of a computer that implements a detection device according to an example embodiment.

As illustrated in FIG. 18, the computer 70 includes a processor 71, a memory 72, a storage 73, an input/output interface (an input/output I/F) 74, a communication interface (a communication I/F) 75, and the like. The processor 71, the memory 72, the storage 73, the input/output interface 74, and the communication interface 75 are connected by a data transmission line for mutually transmitting or receiving data.

The processor 71 is an arithmetic processing device such as a central processing unit (CPU) or a graphics processing unit (GPU). The memory 72 is a memory such as a random access memory (RAM) or a read only memory (ROM). The storage 73 is a storage device such as a hard disk drive (HDD), a solid state drive (SSD), or a memory card. Furthermore, the storage 73 may be a memory such as a RAM or a ROM.

The storage 73 stores, for example, a program. In addition, the program includes a command group (or software code) for causing a computer to execute one or more functions in the detection devices 50 described in the above-described example embodiments when read by the computer. The components included in the detection device 50 may be implemented by the processor 71 reading and executing the program stored in the storage 73. Here, in executing the program described above, the processor 71 may read the program into the memory 72 and execute the program, or may execute the program without reading the program into the memory 72. The memory 72 and the storage 73 also serve to store information and data held by the components included in the detection device 50.

The above-described program may be stored in a non-transitory computer-readable medium or a tangible storage medium. As an example and not by way of limitation, the computer-readable medium or tangible storage medium includes a RAM, a ROM, a flash memory, a solid-state drive (SSD) or other memory technology, a compact disc (CD)-ROM, a digital versatile disc (DVD), a Blu-ray (registered trademark) disk or other optical disk storage, a magnetic cassette, a magnetic tape, a magnetic disk storage, or other magnetic storage devices. Further, the above-described program may be transmitted on a transitory computer-readable medium or a communication medium. As an example and not by way of limitation, the transitory computer-readable medium or communication medium include electrical, optical, acoustic, or other forms of propagation signals.

The input/output interface 74 is connected to a display device 741, an input device 742, a sound output device 743, or the like. The display device 741 is a device that displays a screen corresponding to drawing data processed by the processor 71, such as a liquid crystal display (LCD), a cathode ray tube (CRT) display, or monitor. The input device 742 is a device that accepts an input of a user's operation, and is, for example, a keyboard, a mouse, a touch sensor, and the like. The display device 741 and the input device 742 may be integrated, and may be implemented as a touch panel. The sound output device 743 is a device that acoustically outputs sound corresponding to acoustic data that has been processed by the processor 71, such as a speaker.

The communication interface 75 transmits or receives data to and from an external device. For example, the communication interface 75 performs communication with an external device via a wired communication line or a wireless communication line.

Although the present disclosure has been described with reference to the example embodiments, the present disclosure is not limited to the example embodiments described above. Various modifications that can be understood by those skilled in the art can be made to the configuration and details of the present disclosure within the scope of the present disclosure.

For example, some or all of the above-described example embodiments may be used in combination with each other.

Furthermore, some or all of the example embodiments described above can also be described as described in the following supplementary notes, but are not limited to the following.

(Supplementary Note 1)

A detection system including:
- an optical fiber embedded in or near an embankment of a river;
- a communication unit configured to receive, from the optical fiber, an optical signal including a pattern indicating that the optical fiber is exposed; and
- a detection unit configured to detect breakage of the embankment based on the pattern.

(Supplementary Note 2)

The detection system according to Supplementary Note 1, in which the detection unit detects the breakage of the embankment based on a vibration pattern included in the optical signal and indicating that the optical fiber is exposed.

(Supplementary Note 3)

The detection system according to Supplementary Note 1 or 2, in which the detection unit specifies a location where the breakage of the embankment has occurred based on the optical signal.

(Supplementary Note 4)

The detection system according to Supplementary Note 3, further including:
- a camera for monitoring the river and the embankment; and
- a camera control unit configured to control the camera to image the location where the breakage of the embankment has occurred.

(Supplementary Note 5)

The detection system according to Supplementary Note 3 or 4, further including a notification unit configured to notify a predetermined notification destination of occurrence of the breakage of the embankment and the location where the breakage of the embankment has occurred.

(Supplementary Note 6)

A detection device including:
- a communication unit configured to receive, from an optical fiber embedded in or near an embankment of a river, an optical signal including a pattern indicating that the optical fiber is exposed; and
- a detection unit configured to detect breakage of the embankment based on the pattern.

(Supplementary Note 7)

The detection device according to Supplementary Note 6, in which the detection unit detects the breakage of the embankment based on a vibration pattern included in the optical signal and indicating that the optical fiber is exposed.

(Supplementary Note 8)

The detection device according to Supplementary Note 6 or 7, in which the detection unit specifies a location where the breakage of the embankment has occurred based on the optical signal.

(Supplementary Note 9)

The detection device according to the Supplementary Note 8, further including a camera control unit configured to control a camera for monitoring the river and the embankment to image the location where the breakage of the embankment has occurred.

(Supplementary Note 10)

The detection device according to Supplementary Note 8 or 9, further including a notification unit configured to notify a predetermined notification destination of occurrence of the breakage of the embankment and the location where the breakage of the embankment has occurred.

(Supplementary Note 11)

A detection method executed by a detection device, the detection method including:

a reception step of receiving, from an optical fiber embedded in or near an embankment of a river, an optical signal including a pattern indicating that the optical fiber is exposed; and a detection step of detecting breakage of the embankment based on the pattern.

(Supplementary Note 12)

The detection method according to Supplementary Note 11, in which in the detection step, the breakage of the embankment is detected based on a vibration pattern included in the optical signal and indicating that the optical fiber is exposed.

(Supplementary Note 13)

The detection method according to Supplementary Note 11 or 12, in which in the detection step, a location where the breakage of the embankment has occurred is specified based on the optical signal.

(Supplementary Note 14)

The detection method according to the Supplementary Note 13, further including a step of controlling a camera for monitoring the river and the embankment to image the location where the breakage of the embankment has occurred.

(Supplementary Note 15)

The detection method according to Supplementary Note 13 or 14, further including a step of notifying a predetermined notification destination of occurrence of the breakage of the embankment and the location where the breakage of the embankment has occurred.

REFERENCE SIGNS LIST

10 RIVER
20 EMBANKMENT
30 OPTICAL FIBER
40 SENSING EQUIPMENT
41 COMMUNICATION UNIT
50 DETECTION DEVICE
51 DETECTION UNIT
52 NOTIFICATION UNIT
53 CAMERA CONTROL UNIT
60 CAMERA
70 COMPUTER
71 PROCESSOR
72 MEMORY
73 STORAGE
74 INPUT/OUTPUT INTERFACE
741 DISPLAY DEVICE
742 INPUT DEVICE
743 SOUND OUTPUT DEVICE
75 COMMUNICATION INTERFACE
W WATER

What is claimed is:

1. A detection system comprising:

an optical fiber embedded in or near an embankment of a river;

at least one memory storing instructions, and at least one processor configured to execute the instructions to:

receive, from the optical fiber, an optical signal including a vibration pattern or a temperature pattern indicating that the optical fiber is exposed; and detect breakage of the embankment based on the vibration pattern or the temperature pattern.

2. The detection system according to claim 1, wherein the at least one processor is further configured to execute the instructions to specify a location where the breakage of the embankment has occurred based on the optical signal.

3. The detection system according to claim 2, further comprising:

a camera for monitoring the river and the embankment;

wherein the at least one processor is further configured to execute the instructions to control the camera to image the location where the breakage of the embankment has occurred.

4. The detection system according to claim 2, wherein the at least one processor is further configured to execute the instructions to notify a predetermined notification destination of occurrence of the breakage of the embankment and the location where the breakage of the embankment has occurred.

5. A detection device comprising:

at least one memory storing instructions, and at least one processor configured to execute the instructions to:

receive, from an optical fiber embedded in or near an embankment of a river, an optical signal including a vibration pattern or a temperature pattern indicating that the optical fiber is exposed; and detect breakage of the embankment based on the vibration pattern or the temperature pattern.

6. The detection device according to claim 5, wherein the at least one processor is further configured to execute the instructions to specify a location where the breakage of the embankment has occurred based on the optical signal.

7. The detection device according to claim 6, wherein the at least one processor is further configured to execute the instructions to control a camera for monitoring the river and the embankment to image the location where the breakage of the embankment has occurred.

8. The detection device according to claim 6, wherein the at least one processor is further configured to execute the instructions to notify a predetermined notification destination of occurrence of the breakage of the embankment and the location where the breakage of the embankment has occurred.

9. A detection method executed by a detection device, the detection method comprising:

a reception step of receiving, from an optical fiber embedded in or near an embankment of a river, an optical signal including a vibration pattern or a temperature pattern indicating that the optical fiber is exposed; and a detection step of detecting breakage of the embankment based on the vibration pattern or the temperature pattern.

10. The detection method according to claim 9, wherein in the detection step, a location where the breakage of the embankment has occurred is specified based on the optical signal.

11. The detection method according to claim 10, further comprising a step of controlling a camera for monitoring the river and the embankment to image the location where the breakage of the embankment has occurred.

12. The detection method according to claim 10, further comprising a step of notifying a predetermined notification destination of occurrence of the breakage of the embankment and the location where the breakage of the embankment has occurred.

* * * * *